Jan. 3, 1967 G. FIORENTINO ETAL 3,295,778

TAPE TAKE-UP DEVICE

Filed April 30, 1964

INVENTOR.

Guido Fiorentino and

Domenico Bertina

BY John Toggenburger

AGENT 3,295,778
TAPE TAKE-UP DEVICE

Guido Fiorentino, Ivrea, and Domenico Bertina, Parella, Italy, assignors to Ing. C. Olivetti & C., S.p.A., Ivrea, Italy, a corporation of Italy Filed Apr. 30, 1964, Ser. No. 363,946
Claims priority, application Italy, May 30, 1963, 11,552/63
4 Claims. (Cl. 242—55.12)

This invention relates to a tape takeup device for record tape handling apparatus, for example a perforated tape punching or reading apparatus, comprising means for feeding the tape at a predetermined speed, and a removable core for taking-up said tape.

Generally to takeup a tape around the core of a reel the end of the tape needs to be manually latched to the core. This latching operation is time consuming, whereby the recording or reading operation must be discontinued when the tape is to be changed.

Automatic tape latching devices have been proposed, comprising for example a pin secured to the real core and a ring secured to an end of the tape. However, these devices are not reliable in their operation and are unsuitable for perforated paper tape, because they may cause the tape to be torn.

The primary object of the invention is to provide a tape takeup device obviating the above diadvantages.

Another object is to provide a tape takeup device constantly urging the tape end toward the reel core.

A further object is to provide a tape takeup device always urging the tape to be closely wound around the core.

According to the invention, we now provide a tape takeup device, comprising means for feeding the tape at a predetermined speed, a pair of rotatable flanges adapted to assume a mutual distance less than the width of said tape, a removable core for taking-up said tape and adapted to be frictionally rotated by one of said flanges at a peripheric speed greater than said predetermined speed, and yieldable means for urging one of said flanges toward the other so as to slightly pinch the edges of said tape therebetween.

Other features and advantages of the invention will become apparent from the following description of a preferred embodiment thereof, made by way of example and not in a limiting sense, in conjunction with the accompanying drawing, wherein.

Figure 2:
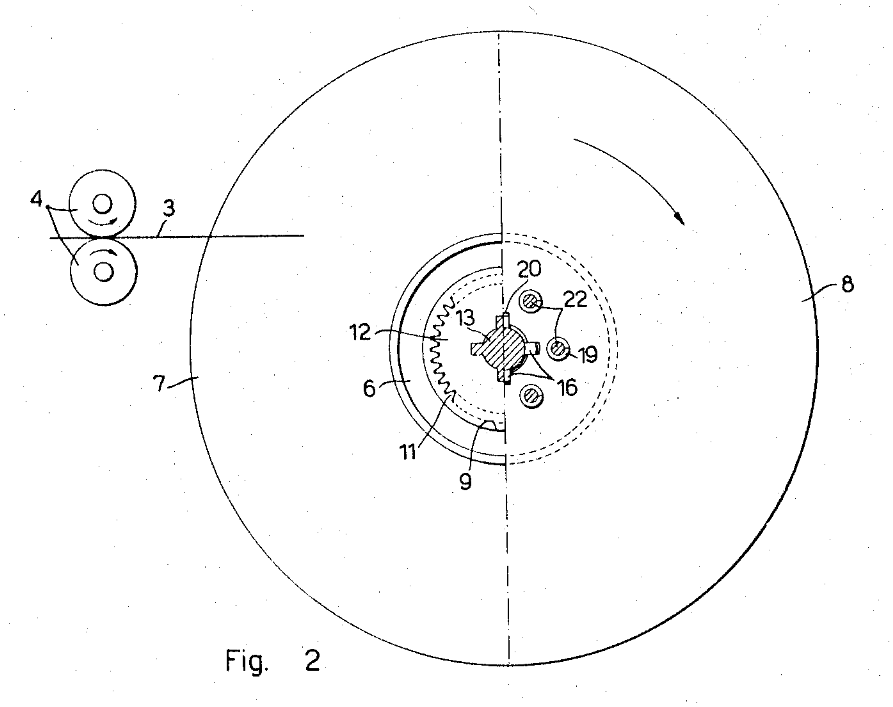
FIG. 2 is a sectional view taken on the line II—II of FIG. 1.

With reference to FIG. 2, the tape takeup device comprises means for feeding a record tape 3 at a predetermined speed rightwards, said tape coming out from a tape handling apparatus, for example a perforated tape coming out from a punching or reading apparatus. Said feeding means comprise a pair of rollers 4, one of which is rotated in a known manner, and is yieldably contacted by the other one, whereby the rollers 4 will rotate in opposite directions. The fed tape 3 must be taken up around a removable core 6.

Figure 1:
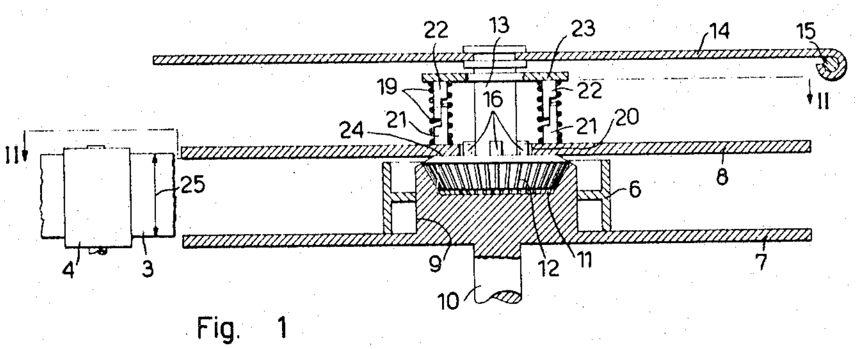
FIG. 1 is a partial diametral sectional view of a tape takeup device according to the invention.

The tape takeup device further comprises a pair of rotatable horizontal flanges 7 and 8 (FIG. 1). The core 6 is adapted to be frictionally rotated by a hub 9 integral with the flange 7 and with a rotatable shaft 10. This shaft is adapted to be rotated clockwise (FIG. 2) in a known manner at such a speed as to cause the core 6 to be frictionally rotated by the hub 9 at a peripheric speed greater than the peripheric speed of the rollers 4, and therefore greater than the predetermined feeding speed of the tape 3.

Furthermore, the device comprises clutch means for causing the flange 8 to be positively rotated by the flange 7. Said clutch means comprise a driving clutch member formed of a toothed inner surface 11 of the hub 9, and a driven clutch member formed of a toothed wheel 12 (FIG. 1) secured to a shaft 13 rotatably mounted on a cover plate 14. The shaft 13 is provided with four radial projections 16 engaging four corresponding notches 20 of the flange 8 with a clearance so as the flange 8 is slightly tiltable in any radial direction with respect to the wheel 12 and therefore with respect to the flange 7.

Yieldable means are provided for urging one of the flanges 7 and 8 toward the other one to slightly pinch the edges of the tape 3 therebetween. More particularly, said yieldable means are formed of a set of compression springs 19 circularly arranged between the flange 8 and a disk 23 secured to the shaft 13. Each spring 19 is wound around a pair of pins 21 and 22, secured respectively to the flange 8 and to the disk 23. Normally the springs 19 urge the flange 8 to contact an upper surface 24 of the wheel 12, and the flanges 7 and 8 assume a mutual distance less than the width 25 of the tape 3.

Finally, the cover plate 14 is rockably mounted on a stationary shaft 15.

The tape takeup device operates as follows.

By rocking the cover plate 14 clockwise about the shaft 15, the shaft 13 is raised together with the flange 8 and the wheel 12 is disengaged from the toothed surface 11 of the hub 9. Now the core 6 and the taken-up tape 3 may be removed from the device, and another core 6 may be frictionally mounted on the hub 9. Then the cover plate 14 is returned counterclockwise to its position shown in FIG. 1, whereby the wheel 12 reengages the hub 9. Finally, the end of the tape 3 is located between the rollers 4, and the device is ready to take up the tape 3.

When the rollers 4 are rotated and the tape 3 advances rightwards, the shaft 10 is rotated clockwise (FIG. 2). The end of the tape 3 (FIG. 1) is then forced between the flanges 7 and 8, which by the urge of the springs 19 slightly pinch the edges of the tape 3 therebetween.

The end of tape 3 is thus urged by the flanges 7 and 8 (FIG. 2) to follow a circular path about the core 6. However, due to the greater speed of the flanges 7 and 8 with respect to the tape 3, the end of the tape 3 is urged toward the center, where the speed is minor, and thus the tape 3 is wound or taken-up about the core 6. Since this latter is frictionally mounted on the hub 9, on one hand the core 6 may slip with respect thereto, on the other hand it causes the tape to be constantly wound close around the core 6, whereby the tape 3 is perfectly taken up.

If it is desired to invert the movement of the tape 3 and to unwind same from the core 6, through a manual control member not shown in the drawing, the rotation of the rollers 4 may be inverted, whereas the shaft 10 continues to rotate clockwise. The flanges 7 and 8 now contribute to brake slightly the core 6 and to hold always the tape 3 wound close around the core 6.

It is intended that various modifications, improvements and addition of parts may be made to the described tape takeup device without departing from the scope of the invention. For example the springs 19 and the corresponding pins 21 and 22 may be substituted by a single leaf spring mounted on the shaft 13 and provided with a set of radial leaf arms. Furthermore, means may be provided between the rollers 4 and the flanges 7 and 8 to guide the tape 3, thus assisting the tape end in entering between the flanges. Finally, the rollers 4 may be rotated intermittently. In this case the predetermined speed of the tape is represented by its average speed during a cycle.

What we claim is:

1. A tape takeup device for a record tape handling apparatus, for example a perforated tape punching or reading apparatus, comprising in combination:

(a) means for feeding the tape at a predetermined speed, (b) a first rotatable horizontal flange, (c) a removable core for taking-up said tape, (d) means for causing said core to be frictionally rotated by said flange at a peripheric speed greater than said predetermined speed, (e) a horizontal cover plate, (f) a second flange rotatably mounted on said cover plate, (g) clutch means for causing said second flange to be positively rotated by said first flange, (h) means for connecting said clutch means and said second flange with a clearance enabling said second flange to be tiltable in any radial direction with respect to said clutch means, (i) a set of spring elements arranged concentrically with said core between said cover plate and said second flange to urge said second flange toward said first flange so as to slightly pinch the edge of said tape therebetween, (j) and horizontal pivot means for enabling said cover plate to be rocked together with said second flange to permit removal of said core and the taken-up tape from the device.

2. A tape takeup device for perforated tape punching or reading apparatus, comprising in combination:

(a) means for feeding the tape at a predetermined speed, (b) a first rotatable horizontal flange, (c) a removable core for taking-up said tape, (d) means for causing said core to be frictionally rotated by said flange at a peripheric speed greater than said predetermined speed, (e) a horizontal cover plate, (f) a second flange, (g) a driving clutch member secured to said first flange, (h) a driven clutch member rotatably mounted on said cover plate and adapted to be rotated by said driving clutch member, (i) means for connecting said driving clutch member and said second flange with a clearance enabling said second flange to be tiltable in any radial direction with respect to said driving clutch member, (j) a set of spring elements arranged concentrically with said core between said cover plate and said second flange to urge said second flange toward said first flange so as to slightly pinch the edge of said tape therebetween, (k) and horizontal pivot means for enabling said cover plate to be rocked together with said second flange and said driven clutch member to permit removal of said core and the taken-up tape from the device.

3. A tape takeup device having means for feeding the tape at a predetermined speed, a core for taking up said tape and comprising in combination:

(a) a pair of flanges yieldably urged one toward the other to assume a mutual distance less than the width of said tape for slightly pinching the edges of an end of said tape therebetween, (b) means for rotatably mounting said flanges on said device, (c) means for rotating a first flange of said pair at a peripheric speed greater than said predetermined speed, (d) means removably mounting said core on said first flange so as to be frictionally rotated thereby, (e) clutch means for causing the other flange of said pair to be rotated by said first flange, (f) and means for enabling said clutch to be disengaged and said second flange to be removed to permit removal of said core and the taken-up tape from said device.

4. A tape takeup device having means for feeding the tape at a predetermined speed, a core for taking up said tape, and comprising in combination:

(a) a pair of flanges, (b) means for rotatably mounting a first flange of said pair on said device, (c) means for rotating said first flange at a peripheric speed greater than said predetermined speed, (d) a hub integral with said first flange, (e) means removably mounting said core on said hub so as to be frictionally rotated thereby, (f) a cover plate rotatably mounting the other flange of said plate, (g) clutch means for causing said other flange of said pair to be rotated by said first flange, (h) means for connecting said clutch means and said second flange with a clearance enabling said second flange to be tiltable in any radial direction with respect to said clutch means and said plate, (i) a set of compression springs arranged concentrically with said hub between said plate and said second flange to urge said second flange towards said first flange at a distance less than the width of said tape for slightly pinching the edges of an end of said tape therebetween, (j) and means for enabling said clutch to be disengaged and said second flange to be removed together with said plate to permit removal of said core and the taken-up tape from the device.

References Cited by the Examiner

UNITED STATES PATENTS

| | | | |
|---|---|---|---|
| 713,870 | 11/1902 | Gally | 242—71.9 |
| 2,015,860 | 10/1935 | May | 242—74 |
| 3,043,533 | 7/1962 | Faulkner et al. | 242—129.51 X |
| 3,056,563 | 10/1962 | Whitnah | 242—71.8 |
| 3,126,161 | 3/1964 | Bemiss et al. | 242—55.12 |

FRANK J. COHEN, *Primary Examiner.*

GEORGE F. MAUTZ, *Examiner.*